US009457413B2

(12) United States Patent
Matsumoto et al.

(10) Patent No.: US 9,457,413 B2
(45) Date of Patent: Oct. 4, 2016

(54) CUTTING INSERT AND ROTARY CUTTING TOOL

(71) Applicants: Osamu Matsumoto, Iwaki (JP); Souzou Kawasaki, Iwaki (JP)

(72) Inventors: Osamu Matsumoto, Iwaki (JP); Souzou Kawasaki, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 624 days.

(21) Appl. No.: 13/739,766

(22) Filed: Jan. 11, 2013

(65) Prior Publication Data

US 2013/0129433 A1 May 23, 2013

Related U.S. Application Data

(63) Continuation-in-part of application No. PCT/JP2012/065426, filed on Jun. 15, 2012.

(30) Foreign Application Priority Data

Jun. 17, 2011 (JP) ................................. 2011-134911

(51) Int. Cl.
*B23C 5/08* (2006.01)
*B23C 5/20* (2006.01)

(52) U.S. Cl.
CPC ................ *B23C 5/207* (2013.01); *B23C 5/08* (2013.01); *B23C 5/205* (2013.01);
(Continued)

(58) Field of Classification Search
CPC ............... B23C 2200/367; B23C 2200/0466; B23C 5/08; B23C 5/207; B23C 5/205; Y10T 407/1906; Y10T 407/1942; Y10T 407/235

USPC ............................. 407/113–115, 42, 117, 24
See application file for complete search history.

(56) References Cited

U.S. PATENT DOCUMENTS 4,169,690 A * 10/1979 Kendra ................. B23B 27/065
407/103
4,832,541 A * 5/1989 Noguchi et al. .............. 407/114
(Continued)

FOREIGN PATENT DOCUMENTS

DE 2315044 10/1974
EP 0439317 7/1991
(Continued)

OTHER PUBLICATIONS

International Prelimninary Report on Patentability (IPRP) dated Dec. 17, 2013 issued in PCT counterpart application (No. PCT/JP2012/065426) with English translation.
(Continued)

*Primary Examiner* — Sara Addisu
(74) *Attorney, Agent, or Firm* — Womble Carlyle

(57) ABSTRACT

A cutting insert includes an insert body portion and a plurality of projecting portions provided integrally with the insert body portion. The projecting portion includes a cutting edge and includes projecting portion upper and lower surfaces, two projecting portion side surfaces, and a projecting portion side end surface extending therebetween. In the projecting portion, a round corner surface extends between the projecting portion upper surface and the projecting portion side end surface. The cutting edge is formed so as to include a corner formed along an edge of the round corner surface and such that the projecting portion side surface serves as a rake face. The projecting portion is designed such that a length between the two projecting portion side surfaces is smaller than a diameter of an inscribed circle defined on the insert body portion.

16 Claims, 19 Drawing Sheets

(52) U.S. Cl.
CPC  *B23C 2200/0466* (2013.01); *B23C 2200/085* (2013.01); *B23C 2200/367* (2013.01); *B23C 2210/168* (2013.01); *B23C 2210/66* (2013.01); *B23C 2220/36* (2013.01); *Y10T 407/1906* (2015.01); *Y10T 407/1942* (2015.01); *Y10T 407/235* (2015.01)

(56) References Cited

U.S. PATENT DOCUMENTS

| | | | | |
|---|---|---|---|---|
| 5,004,379 | A * | 4/1991 | Little | B23B 27/065 407/113 |
| 5,032,050 | A * | 7/1991 | Niebauer | B23B 27/045 407/114 |
| 5,088,861 | A | 2/1992 | Little | |
| 5,308,197 | A | 5/1994 | Little | |
| 5,454,671 | A * | 10/1995 | Qvarth | 407/42 |
| 5,725,334 | A * | 3/1998 | Paya | 407/117 |
| 5,921,721 | A * | 7/1999 | Hintze et al. | 407/113 |
| 5,964,552 | A * | 10/1999 | Larsen | 407/113 |
| 5,975,812 | A * | 11/1999 | Friedman | 407/114 |
| 6,138,540 | A * | 10/2000 | Niemi | 82/1.11 |
| 6,213,691 | B1 * | 4/2001 | Leeb | 407/34 |
| 6,293,738 | B1 * | 9/2001 | Hartlohner et al. | 407/114 |
| 6,428,247 | B1 * | 8/2002 | Friedman | B23B 27/045 407/110 |
| 6,632,051 | B1 * | 10/2003 | Wermeister | 407/114 |
| 6,942,434 | B2 * | 9/2005 | Friedman | B23B 27/08 407/113 |
| 6,986,626 | B2 * | 1/2006 | Gati | 407/113 |
| 7,097,393 | B2 * | 8/2006 | Satran et al. | 407/113 |
| 7,972,090 | B2 * | 7/2011 | Jonsson | B23B 27/045 407/103 |
| 8,573,904 | B2 * | 11/2013 | Weisel | B23C 5/109 407/113 |
| 8,714,886 | B2 * | 5/2014 | Hecht | B23B 27/065 407/103 |
| 8,734,064 | B2 * | 5/2014 | Koontz | 407/113 |
| 2003/0113175 | A1 * | 6/2003 | Wermeister | 407/113 |
| 2003/0215294 | A1 * | 11/2003 | Wermeister et al. | 407/113 |
| 2004/0005199 | A1 * | 1/2004 | Janness | 407/35 |
| 2004/0022590 | A1 | 2/2004 | Satran et al. | |
| 2005/0042044 | A1 | 2/2005 | Satran et al. | |
| 2006/0078392 | A1 * | 4/2006 | Berger et al. | 408/227 |
| 2008/0226403 | A1 * | 9/2008 | Craig | 407/113 |
| 2008/0226404 | A1 * | 9/2008 | Nada et al. | 407/114 |
| 2009/0155004 | A1 * | 6/2009 | Jansson | 407/40 |
| 2009/0252565 | A1 * | 10/2009 | Morgulis | 407/100 |
| 2010/0067992 | A1 * | 3/2010 | Uchijo et al. | 407/100 |
| 2010/0272524 | A1 * | 10/2010 | Gati | 407/110 |
| 2010/0329800 | A1 * | 12/2010 | Edler et al. | 407/114 |
| 2011/0052337 | A1 * | 3/2011 | Dudzinsky et al. | 407/40 |
| 2012/0003052 | A1 | 1/2012 | Ejderklint | |
| 2012/0195700 | A1 * | 8/2012 | Chen et al. | 407/40 |
| 2012/0201622 | A1 | 8/2012 | Kocherovsky et al. | |
| 2012/0308317 | A1 * | 12/2012 | Choi et al. | 407/47 |
| 2013/0108387 | A1 * | 5/2013 | Ishi et al. | 409/132 |
| 2013/0309028 | A1 * | 11/2013 | Chistyakov | 407/114 |

FOREIGN PATENT DOCUMENTS

| | | |
|---|---|---|
| EP | 0850715 A1 | 7/1998 |
| JP | H03-117503 U | 12/1991 |
| JP | H06 262422 | 9/1994 |
| JP | 2005-074531 | 3/2005 |
| JP | 2008-105115 A | 5/2008 |

OTHER PUBLICATIONS

International Search Report and Written Opinion dated Jul. 10, 2012 issued in PCT counterpart application (No. PCT/JP2012/065426).
Extended European Search Report issued on May 26, 2015 in counterpart European Patent Application (No. 12800349.8).

* cited by examiner

CUTTING INSERT AND ROTARY CUTTING TOOL

CROSS-REFERENCE TO RELATED APPLICATIONS

This is a continuation-in-part of PCT application No. PCT/JP2012/065426, filed Jun. 15, 2012, which claims the benefit of Japanese Patent Application No. 2011-134911, filed Jun. 17, 2011. The contents of the aforementioned applications are incorporated by reference in their entirety.

BACKGROUND OF THE INVENTION

1. Field of the Invention

The present invention relates to a cutting insert and a cutting tool in which the cutting insert is mounted. In particular, the present invention relates to a tangential cutting insert for use in grooving (slotting) and an indexable rotary cutting tool in which the cutting insert is detachably mounted.

2. Description of the Related Art

An indexable side cutter is a conventional rotary cutting tool which can carry out grooving. In general, the grooving needs to provide a round corner formed of a curved surface, that is, a curved corner surface, in a corner between a groove bottom processed in a workpiece and a side wall surface continuous with the groove bottom. Stress is likely to concentrate between the groove bottom and the side wall surface. Thus, without the curved corner surface, the workpiece may be cracked starting from the corner portion and may thus be likely to be damaged. Consequently, it is important for the indexable side cutter to include a cutting insert which allows round chamfering for various sizes, that is, processing for forming a curved surface, to be carried out on groove corners.

A conventional cutting insert is shaped, for example, as shown in FIG. 18. A cutting insert 601 in FIG. 18 is of a tangential type which appears shaped substantially like a rectangle in a plan view. The insert 601 includes cutting edges 605 formed at edges of a set of opposite side surfaces 603, that is, the side surfaces 603 positioned opposite each other, and round corner surfaces, that is, curved corner surfaces 607, formed to extend between the opposite side surfaces. The corners of the cutting edges 605 extending along the edges of the round corner surfaces 607 can serve to form curved corner surfaces at corners of a groove.

Furthermore, Japanese Patent Laid-Open No. H6-262422 (1994) discloses another form of a tangential cutting insert. FIG. 19 shows an example of a conventional cutting insert with cutting edges provided at positions similar to those on the cutting insert in Japanese Patent Laid-Open No. H6-262422 (1994). A cutting insert 701 in FIG. 19 appears shaped substantially like a rectangle in a plan view. The cutting insert 701 includes cutting edges 703 arranged at equal intervals in a circumferential direction around an insert central axis. The cutting insert 701 is no-hand insert, and all the cutting edges 703 are oriented in the respective predetermined directions. A cutting insert of this type may further include such round corner surfaces as shown in FIG. 18 in order to process curved corner surfaces at corners of a groove.

In general, when a cutting insert is mounted in a tool body of a cutting tool, the cutting insert is preferably mounted so as to have a radial rake angle of, for example, 0° or a positive radial rake angle. Alternatively, even if the radial rake angle is negative, the cutting insert is preferably mounted in the tool body so as to reduce the level of the negativity. A reason for this is that a larger negative radial rake angle enhances impact and cutting resistance resulting from cutting of a cutting edge into a workpiece, thus increasing the possibility of damaging the cutting insert.

For the conventional cutting insert shown in FIG. 18, the length between the side surfaces of the cutting insert needs to be reduced in order to arrange the cutting insert such that the cutting insert has a small negative radial rake angle or a positive radial rake angle around the tool body of the rotary cutting tool. However, the length between the side surfaces of the cutting insert, that is, the length of the round corner surface, is equal to the diameter of an inscribed circle of the cutting insert as seen in a plan view. That is, the length between the side surfaces is in proportion to the size of the cutting insert as a whole. Thus, reducing the length between the side surfaces needs to decrease the size of the cutting insert as a whole. However, the cutting insert needs to include a mounting hole for attaching and detaching of the cutting insert to a tool body, formed in the center thereof and having a given size. Hence, a simple reduction in the size of the cutting insert may disadvantageously significantly decrease the strength of the cutting insert. Furthermore, a simple increase in the size of the round corner surface correspondingly reduces the contact area between an abutment surface of an insert mounting seat in the tool body and the side surfaces of the cutting insert. This may disadvantageously hinder the cutting insert from being appropriately fixed.

Furthermore, like the cutting insert in FIG. 18, such a cutting insert as shown in Japanese Patent Laid-Open No. H6-262422 (1994) or FIG. 19 has a problem with the radial rake angle. Moreover, when such round corner surfaces as described above are formed on a cutting insert of the type shown in FIG. 19, the design of the round corner surfaces is limited because the cutting edges are formed at intervals of 90° around the central axis of the mounting hole. If the round corner surfaces formed have a certain size or larger, the round corner surface for one cutting edge may affect the adjacent cutting edge. This hinders the cutting edges from being formed at intervals of 90°, thus possibly reducing the number of cutting edges in the cutting insert. Curved corner surfaces of a groove to be formed vary depending on the width and depth of the groove to be processed. Thus, the lack of the ability to freely design round corner surfaces corresponding to curved corner surfaces of various sizes is very disadvantageous.

SUMMARY OF THE INVENTION

In view of the above-described problems, an object of the present invention is to provide a cutting insert and a cutting tool which allow the radial rake angle to be suitably set without the need to reduce the size of the cutting insert.

Moreover, an object of the present invention is to provide a cutting insert and a cutting tool which enables an increase in the degree of freedom of the design of round corner surfaces as described above.

An aspect of the present invention provides a cutting insert including an insert body portion with a body portion upper surface, a body portion lower surface located opposite the body portion upper surface, and body portion side surfaces extending between the body portion upper surface and the body portion lower surface, the insert body portion including an axis defined therein which passes through the body portion upper surface and the body portion lower surface, and a plurality of projecting portions each including a cutting edge and each provided integrally with the insert body portion at an outer position of the insert body portion in a direction orthogonal to the axis, wherein the projecting portion includes a projecting portion upper surface connected to the body portion upper surface, a projecting portion lower surface connected to the body portion lower surface, two projecting portion side surfaces each connected to the corresponding body portion side surface, and a projecting portion side end surface extending therebetween, and the projecting portion includes a round corner surface formed thereon and extending between the projecting portion upper surface and the projecting portion side end surface, wherein the cutting edge is formed along an intersecting ridge portion between the projecting portion side surface and each of the projecting portion upper surface, the round corner surface, and the projecting portion side end surface, so as to include a corner formed along an edge of the round corner surface and such that the projecting portion side surface serves as a rake face, and wherein the projecting portion is designed in such a manner that a length between the two projecting portion side surfaces is shorter than a diameter of an inscribed circle defined on the body portion upper surface.

This configuration includes the projecting portions each with the cutting edge formed integrally with the insert body portion at an outer position of the insert body portion. The length between the two projecting portion side surfaces of the projecting portion is shorter than the diameter of the inscribed circle defined on the body portion upper surface of the insert body portion. Thus, when the cutting insert according to the aspect of the present invention is mounted in the tool body of the cutting tool, the radial rake angle of the cutting edge of the projecting portion can be suitably set regardless of the size of the cutting insert or the insert body portion. Furthermore, the configuration allows a round corner surface to be set for the cutting edge of each projecting portion. This enables an increase in the degree of freedom of the design of the round corner surface.

Preferably, the length between the two projecting portion side surfaces may be larger than a thickness of the insert body portion. Furthermore, the insert body portion may include a raised portion formed on the body portion side surface. In this case, preferably, the raised portion is formed to appear hidden when the cutting insert is seen from a side opposite to the body portion upper surface.

The projecting portions may be formed such that when the body portion upper surface of the insert body portion appears shaped like a polygon, the projecting portions are positioned at vertices of the polygon. Alternatively, the projecting portions may be formed such that when the body portion upper surface of the insert body portion appears shaped like a polygon, the projecting portions are positioned on sides of the polygon. For example, the body portion upper surface of the insert body portion may be shaped substantially like a triangle.

Another aspect of the present invention provides a rotary cutting tool including a tool body with two end surfaces positioned opposite each other and each shaped substantially like a circle, an outer peripheral surface extending between the end surfaces, and a bore hole penetrating both end surfaces, wherein the cutting tool includes an insert mounting seat provided in the tool body and configured in such a manner that the cutting insert as described above is mounted in the insert mounting seat. Preferably, the cutting tool may include a first insert mounting seat which is open in one of the two end surfaces and a second insert mounting seat which is open in the other of the two end surfaces.

Further features of the present invention will become apparent from the following description of exemplary embodiments (with reference to the attached drawings).

DESCRIPTION OF THE EMBODIMENTS

Figure 1:
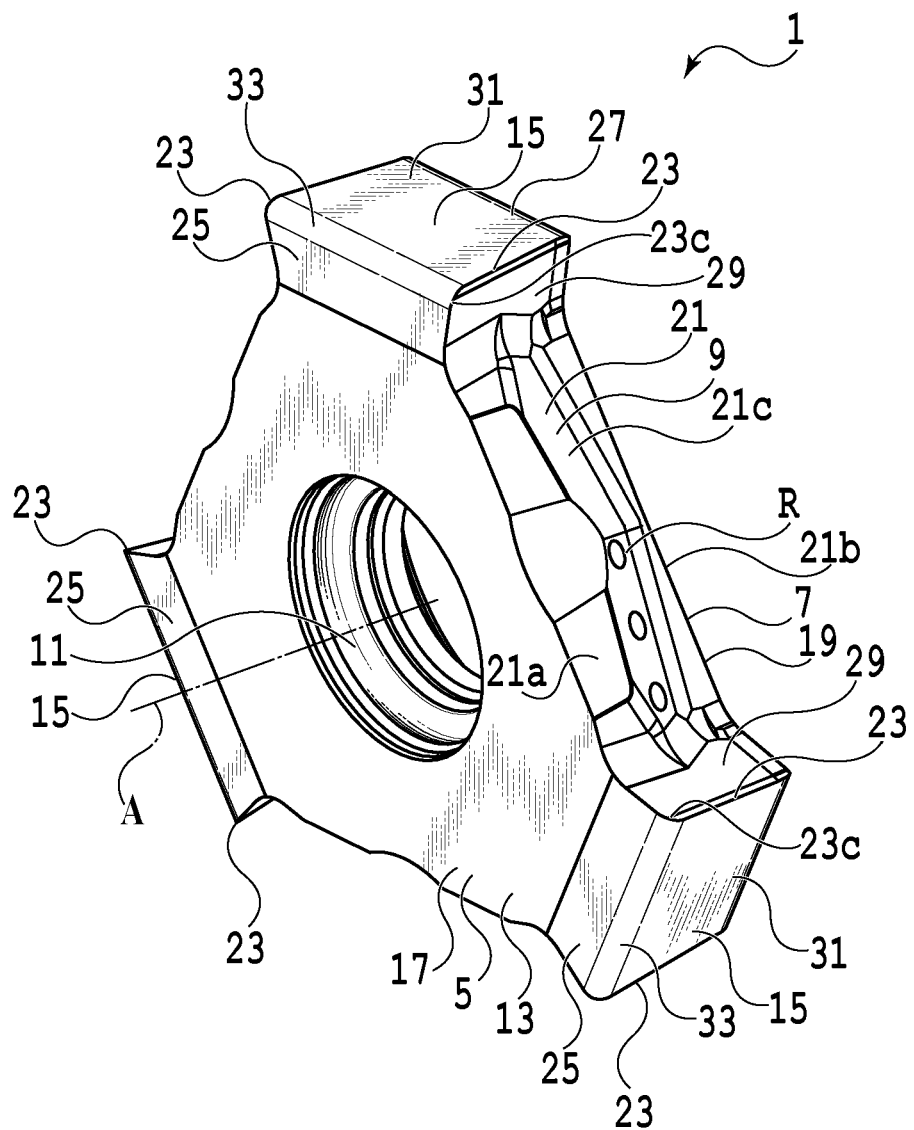
FIG. 1 is a perspective view of a cutting insert according to a first embodiment of the present invention.

Embodiments of the present invention will be described below in detail with reference to the drawings.

First, a cutting insert 1 and a cutting tool 3 according to a first embodiment will be described. The cutting insert 1 is shown in FIG. 1 to FIG. 4.

The cutting insert 1 includes an upper surface 5 and a lower surface 7 which are opposed or positioned opposite each other and a peripheral side surface 9 extending therebetween. The upper surface 5 and the lower surface 7 are substantially parallel. An axis A passing through the upper surface 5 and the lower surface 7 is defined for the cutting insert 1. The cutting insert 1 is shaped substantially rotationally symmetrically around the axis A. An insert mounting hole 11 with a central axis coinciding with the axis A is formed so as to penetrate the upper surface 5 and the lower surface 7.

The cutting insert 1 includes an insert body portion 13 and three projecting portions 15 provided integrally with the insert body portion 13. The insert body portion 13 includes a body portion upper surface 17, a body portion lower surface 19, and body portion side surfaces 21 extending between the body portion upper surface 17 and the body portion lower surface 19. The body portion upper surface 17 and the body portion lower surface 19 are opposed or positioned opposite each other and substantially parallel to each other. One projecting portion 15 is arranged between any two of the three body portion side surfaces 21. The whole cutting insert 1 except for the projecting portions 15 can be defined as the insert body portion 13.

The insert body portion 13 is designed to substantially have a rotationally symmetric shape around the axis A, that is, the central axis of the insert mounting hole 11. Similarly, the three projecting portions 15 are positioned rotationally symmetrically around the axis A. Thus, as described above, the cutting insert 1 is shaped rotationally symmetrically around the axis A.

Figure 2:
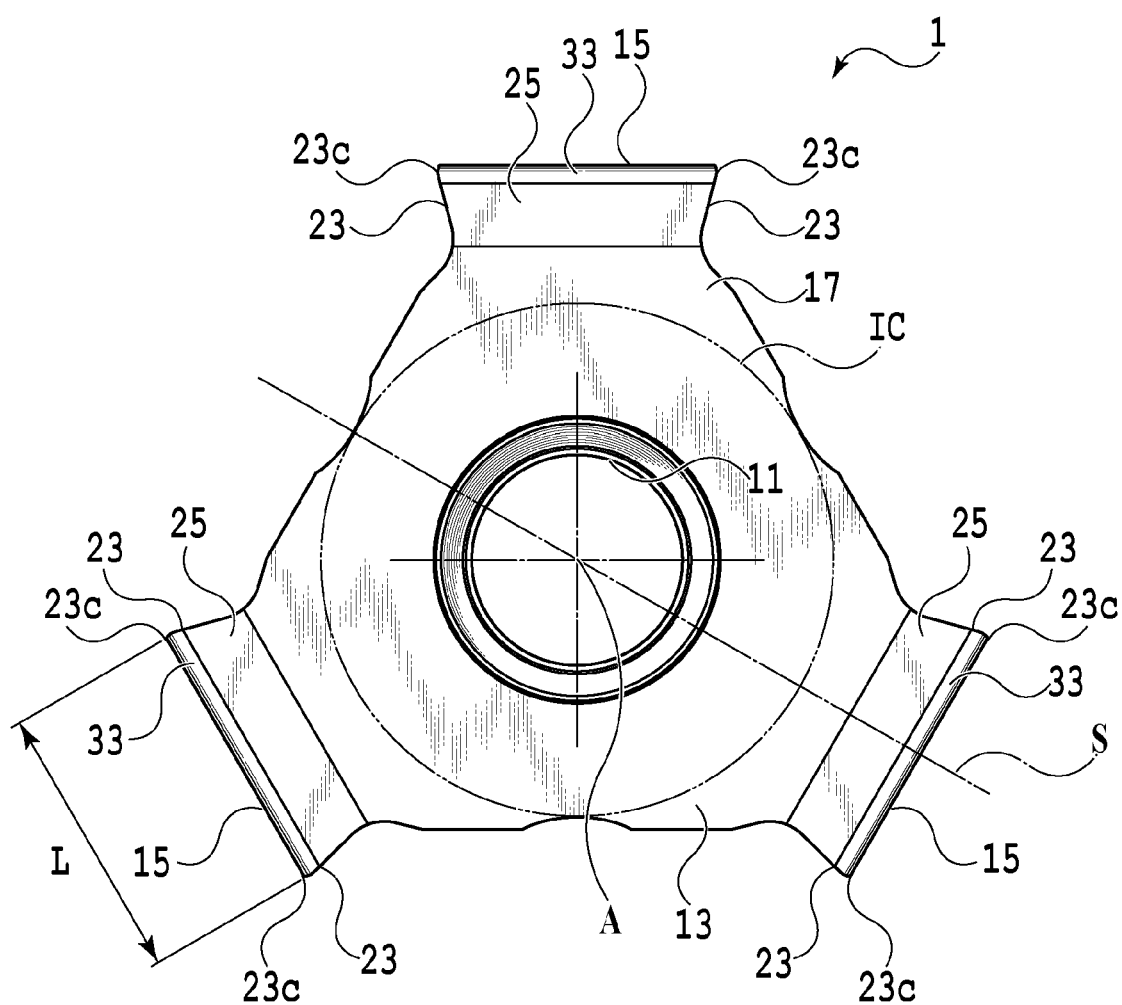
FIG. 2 is a top view of the cutting insert in FIG. 1.

When the body portion upper surface 17 of the insert body portion 13 appears shaped like a triangle or substantially like a triangle, the three projecting portions 15 are located respectively, to be positioned at vertices of the triangle of the body portion upper surface 17 (see FIG. 2). The projecting portions 15 are provided at outer positions of the insert body portion 13 in a direction orthogonal to the axis A and on the periphery of the insert body portion 13. That is, the projecting portions 15 are provided so as to project or extend outward from the insert body portion 13.

The three projecting portions 15 have substantially the same configuration. Thus, any one projecting portion 15 will be described below unless otherwise specified.

The projecting portion 15 includes a cutting edge 23 and is provided at the outer position of the insert body portion 13 in the direction orthogonal to the axis A. The projecting portion 15 is shaped substantially like a rectangular parallelepiped. Specifically, the projecting portion 15 includes a projecting portion upper surface 25 connected to the body portion upper surface 17, a projecting portion lower surface 27 connected to the body portion lower surface 19, two projecting portion side surfaces 29 connected to the corresponding body portion side surfaces 21, and a projecting portion side end surface 31 extending between them. The projecting portion 15 further includes a round corner surface (curved corner surface) 33 formed thereon and extending from one of the two projecting portion side surfaces 29 to the other and between the projecting portion upper surface 25 and the projecting portion side end surface 31.

Figure 3:
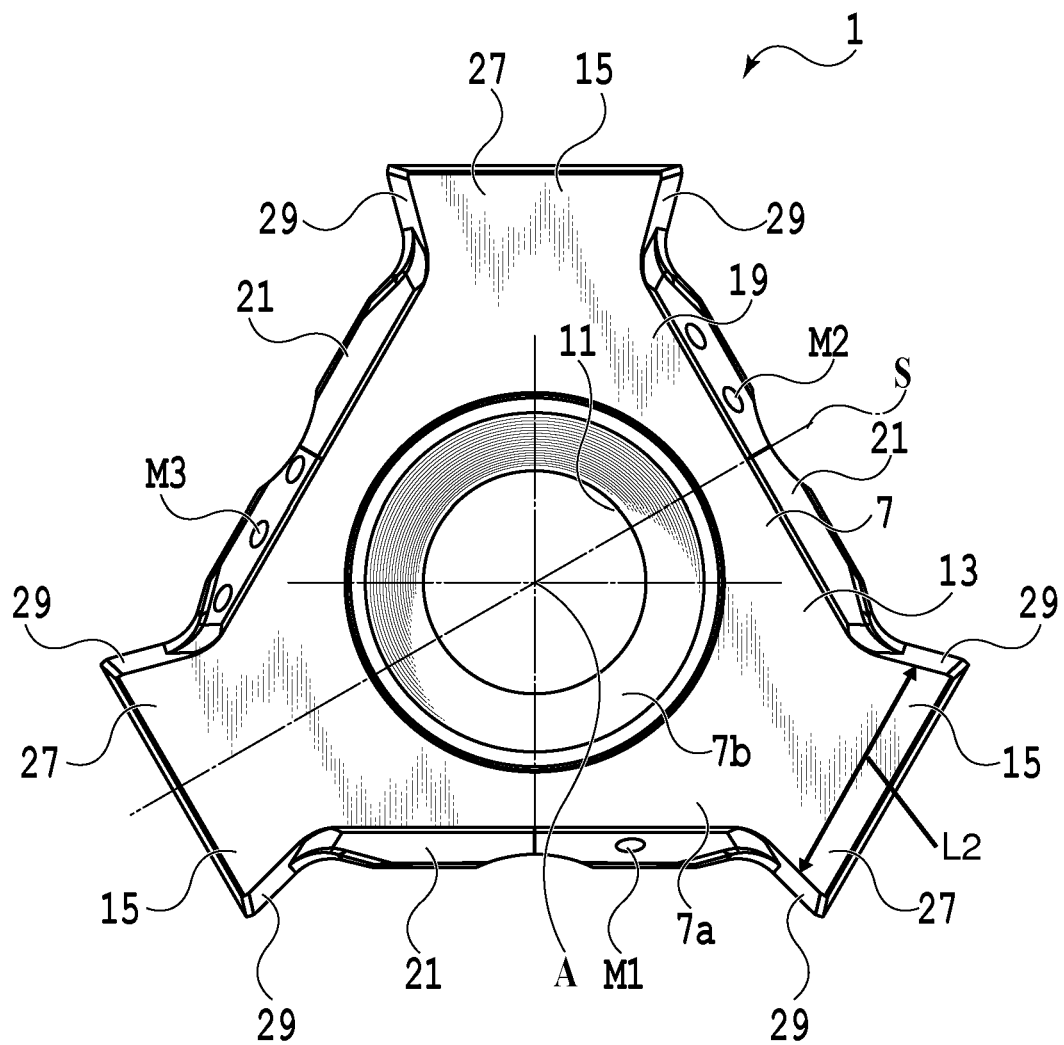
FIG. 3 is a bottom view of the cutting insert in FIG. 1.
Figure 4:
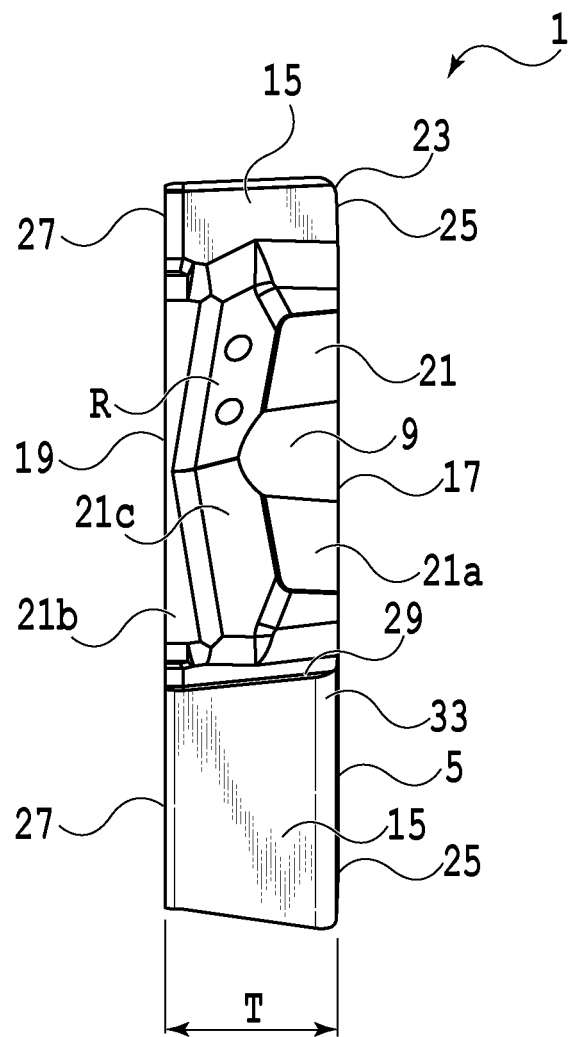
FIG. 4 is a left side view of the cutting insert in FIG. 1.

When a first plane which bisects one projecting portion 15 configured as described above is defined, the first plane can extend so as to contain the axis A. FIGS. 2 and 3 show a first plane S for one projecting portion. The projecting portion 15 is provided so as to be substantially bisected by the first plane S and is formed substantially plane-symmetrically with respect to the first plane S. Furthermore, the round corner surface 33 is formed to have the same or substantially the same curvature on any plane parallel to the first plane S. However, the round corner surface 33 may have a different curvature on any plane parallel to the first plane.

A predetermined range is specified for the length L between the two projecting portion side surfaces 29 of one projecting portion 15, that is, the length L of the round corner surface 33 of the projecting portion 15 in the direction between the two projecting portion side surfaces 29. As shown in FIG. 2, an inscribed circle IC can be defined on the body portion upper surface 17 of the insert body portion 13. The length L of the round corner surface 33 shown in FIG. 2, that is, the length of the round corner surface 33 in a direction orthogonal to the first plane, is shorter than the diameter of the inscribed circle IC. Thus, the length of the round corner surface 33 is sufficiently short compared to the size of the insert body portion 13. Furthermore, the length L of the round corner surface 33 is preferably equal to or larger than the thickness T (see FIG. 4) of the insert body portion 13. In the cutting insert 1, the length L is larger than the thickness T of the insert body portion 13. This enables the strength of the projecting portion 15 to be suitably enhanced with a reduction in the size of the projecting portion 15.

The upper surface 5 of the cutting insert 1 includes the body portion upper surface 17 of the insert body portion 13 and the projecting portion upper surfaces 25 of the three projecting portions 15. The lower surface 7 of the cutting insert 1 includes the body portion lower surface 19 of the insert body portion 13 and the projecting portion lower surfaces 27 of the three projecting portions 15. The peripheral side surface 9 of the cutting insert 1 includes the body portion side surface 21 of the insert body portion 13 and the projecting portion side surfaces 29 and projecting portion side end surfaces 31 of the three projecting portions 15.

One projecting surface 15 includes two cutting edges 23 formed thereon. The two cutting edges 23 have substantially the same configuration except that the cutting edges 23 are symmetric with respect to the above-mentioned first plane. Hence, the cutting edges 23 will be described using the same reference numeral unless otherwise specified.

The cutting edge 23 is formed along an intersecting ridge portion between the projecting portion side surface 29 and each of the projecting portion upper surface 25, the round corner surface 33, and the projecting portion side end surface 31, so as to include a corner 23c formed along an edge of the round corner surface 33 and such that the projecting portion side surface 29 serves as a rake face. The curvature or radius of curvature of the corner 23c can be appropriately changed according to the size of a curved corner surface of a groove desired to be formed in a workpiece. Two cutting edges 23 are formed on one projecting portion 15, and as is apparent from in the figures, are plane-symmetric with respect to the first plane S. That is, one of the cutting edges of one projecting surface 15 can be considered as a right-hand cutting edge, and the other considered as a left-hand cutting edge. Consequently, the cutting insert 1 allows three cutting edges to be used as a right-hand cutting edge, while allowing three other cutting edges to be used as a left-hand cutting edge. Thus, the cutting insert 1 is an indexable cutting insert. The right-hand cutting edge is located on the right side as seen from the edge of the cutting insert 1, and the left-hand cutting edge is located on the left side as seen from the edge of the cutting insert 1.

Each of the cutting edges 23 of the projecting portion 15 is formed such that the corresponding projecting portion side surface 29 serves as a rake face. For one cutting edge 23, the projecting portion upper surface 25, the projecting portion side end surface 31, and the round corner surface 33 serve as a flank. The projecting portion side surface 29 is formed so as to gradually incline inward as the projecting portion side surface 29 extends from the vicinity of the cutting edge 23, particularly the vicinity of the intersecting ridge portion between the projecting portion side surface 29 and the projecting portion upper surface 25, to the projecting portion lower surface 27 side. Thus, the length L2 between the projecting portion side surfaces 29 of one projecting portion 15 decreases from the projecting portion upper surface 25 to the projecting portion lower surface 27 side. Moreover, as understood from in FIG. 3, the projecting portion side surface 29, that is, the rake face, is inclined such that the length L2 between the projecting portion side surfaces 29 of one projecting portion 15 decreases with increasing distance from the cutting edge 23. Also, as seen in FIGS. 2 and 3, none of the projecting portion side surfaces 29 may be visible in a top view of the insert 1 (FIG. 2), but all of the projecting portion side surfaces 29 may be visible in a bottom view of the insert 1 (FIG. 3). The projecting portion side surface 29 of the cutting insert 1 is formed substantially of a plane but may be formed of a curved surface or a combination of a plane and a curved surface, or may have recesses and protrusions. This shape of the projecting portion side surface 29 can contribute to setting the radial rake angle of the cutting edges of the cutting insert 1 in the cutting tool 3 to have a positive angle. Not limited to the cutting insert 1 according to the first embodiment, the present invention also allows the projecting portion side surface 29 to be formed so as to prevent the length between the projecting portion side surfaces 29 from substantially varying depending on the location, that is, so as to allow the projecting portion side surface 29 to extend parallel to the axis A, rather than being inclined.

Furthermore, the lower surface 7 of the cutting insert 1 including the body portion lower surface 19 and the projecting portion lower surfaces 27 includes a substantially annular peripheral portion 7a formed into a flat plane and a recessed portion 7b formed around the mounting hole 11. According to the present embodiment, as described below, the recessed portion 7b corresponds to the shape of an insert mounting seat in the cutting tool as described below. However, the recessed portion 7b may be omitted, and in this case, the insert mounting seat does not have a portion corresponding to the recessed portion 7b. Furthermore, the lower surface 7 may be curved or formed to have recesses and protrusions. However, the lower surface 7 functions as an insert seating surface as described below and can thus be formed with the indexing capability of the cutting insert 1 taken into account.

One body portion side surface 21 is formed between the two projecting portions 15 each configured as described above. The body portion side surface 21 includes an upper surface-side side surface portion 21a, a lower surface-side side surface portion 21b, and an intermediate side surface portion 21c located therebetween. The upper surface-side side surface portion 21a is located farther from the axis A than the lower surface-side side surface portion 21b and configured to be able to function as a seating surface. The cutting insert 1 includes a recessed portion formed in a central portion of the upper surface-side side surface portion 21a and extending substantially parallel to the axis A. However, the recessed portion may be omitted. Furthermore, the intermediate side surface portion 21c is formed to rise outward to form a raised portion R. The raised portion R is designed to increase the thickness of the insert body portion 13 in the direction orthogonal to the axis A, thus enabling contribution to increasing the strength of the cutting insert 1.

The intermediate side surface portion 21c, that is, the raised portion R, is not intended to function as a seating surface. Hence, the raised portion R is formed to appear hidden behind the body portion upper surface 17, that is, to be substantially invisible, in a plan view of the cutting insert 1, that is, when the cutting insert 1 is seen from a side opposite to the upper surface 5 or the body portion upper surface 17. However, the raised portion R of the cutting insert 1 is formed such that the amount by which the raised portion R is raised increases consistently with a distance from each of the projecting portions 15 located on the respective opposite sides of and adjacent to the raised portion R. However, the raised portion R can be raised in a manner different from that described above.

Marks M1, M2, and M3 (see FIG. 3) are formed on the intermediate side surface portion 21c of the cutting insert 1 in order to allow the position or orientation of the insert to be easily determined, particularly to reliably distinguish used cutting edges from unused cutting edges. Thus, the marks may be different from the marks M1, M2, and M3 or may be omitted or provided at other positions.

The cutting insert 1 can be produced using a hard material such as cemented carbide, coated cemented carbide, cermet, ceramic or an ultra high pressure sintered compact containing diamond or cubic boron nitride.

Figure 5:
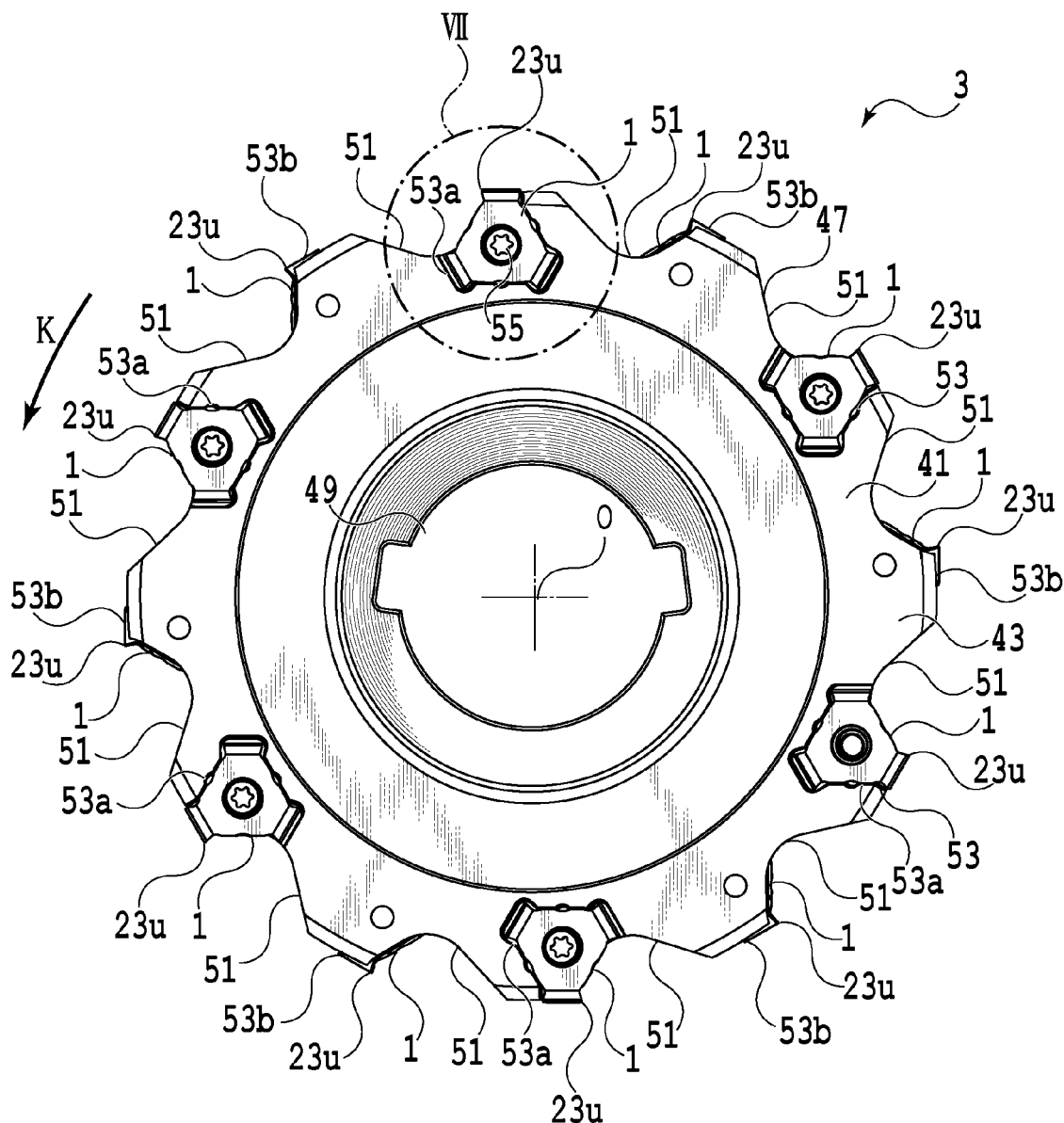
FIG. 5 is an end view of a cutting tool in which the cutting insert in FIG. 1 is mounted according to the first embodiment of the present invention.
Figure 6:
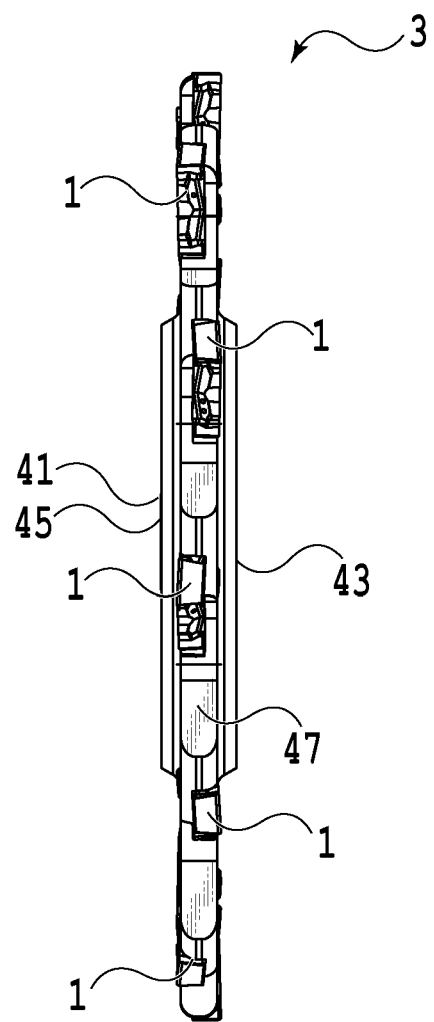
FIG. 6 is a front view of the cutting tool in FIG. 5.

The cutting insert 1 configured as described above is detachably mounted in a tool body 41 of the rotary cutting tool 3 as shown in FIG. 5 and FIG. 6. The cutting tool 3 is rotated around an axis of rotation O.

The tool body 41 basically includes two end surfaces 43 and 45, an outer peripheral surface 47 extending between the two end surfaces 43 and 45, and a bore hole 49 penetrating the center of each of the two end surfaces 43 and 45. The two end surfaces 43 and 45 are opposed or positioned opposite each other and each shaped substantially like a circle. Chip pockets 51 and a plurality of insert mounting seats 53 are formed in an outer peripheral surface 47 of the tool body 41. Each chip pocket 51 is provided so as to suitably discharge chips. The insert mounting seats 53 include two types of insert mounting seats 53a and 53b each provided on the outer peripheral surface adjacent to and backward of the corresponding chip pocket 51 in a tool rotating direction K. One of the insert mounting seats 53a and 53b is for the right-hand cutting edge, and the other is for the left-hand cutting edge. For distinction, one of the insert mounting seats may be referred to as a first insert mounting seat, and the other may be referred to as a second insert mounting seat.

The first insert mounting seats 53a are open in one of the two end surfaces 43 and 45. The second insert mounting seats 53b are open in the other of the two end surfaces 43 and 45. Thus, as well understood from FIG. 5 and FIG. 6, the first insert mounting seats 53a and the second insert mounting seats 53b are alternately formed in the respective end surfaces 43 and 45 in a staggered manner. A plurality of cutting inserts 1 are alternately mounted in the two end surfaces 43 and 45, respectively, in a staggered manner. The first insert mounting seat and the second insert mounting seat are symmetrically shaped and are substantially the same in the other respects. Thus, the removable installation of the cutting insert associated with any one insert mounting seat will be described below.

The cutting insert 1 is tangentially mounted in the insert mounting seat 53 (53a and 53b) so that a corner 23c of a usable cutting edge 23u projects outward. When the cutting insert 1 is mounted, the projecting portion side end surface 31 of the projecting portion 15 of the cutting insert 1 substantially aligns with the outer peripheral surface 47 of the tool body 41, with the round corner surface 33 of the projecting portion 15 positioned outside the outer peripheral surface 47.

Figure 7:
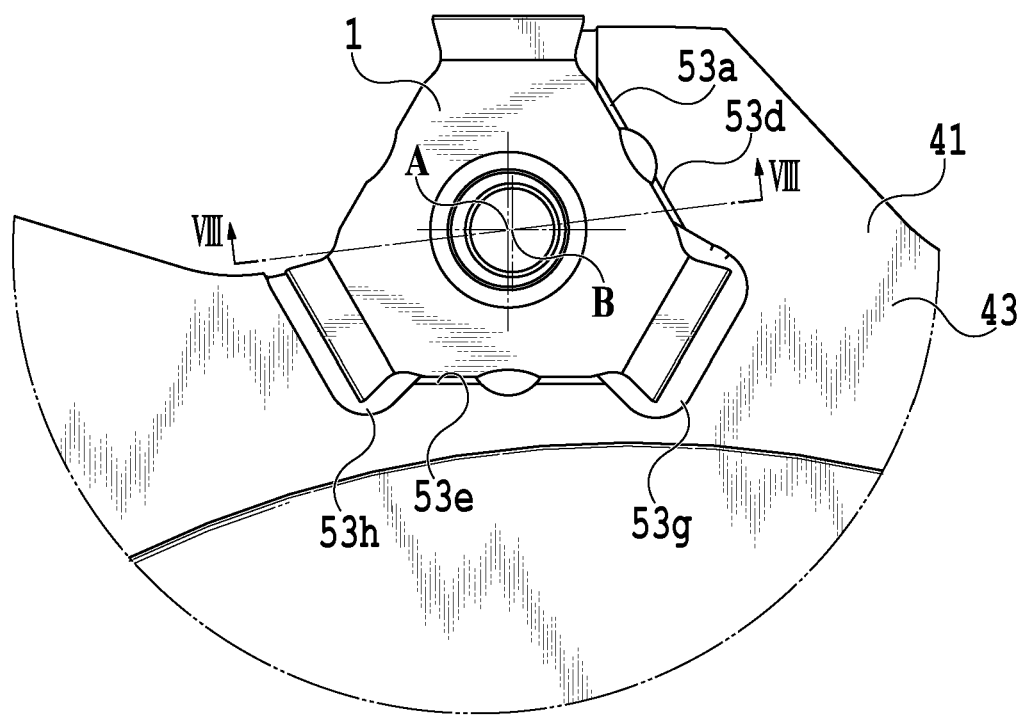
FIG. 7 is a diagram relating to the cutting insert and an insert mounting seat in a portion of FIG. 5 enclosed by a circle VII, wherein a mounting screw has been removed.
Figure 8:
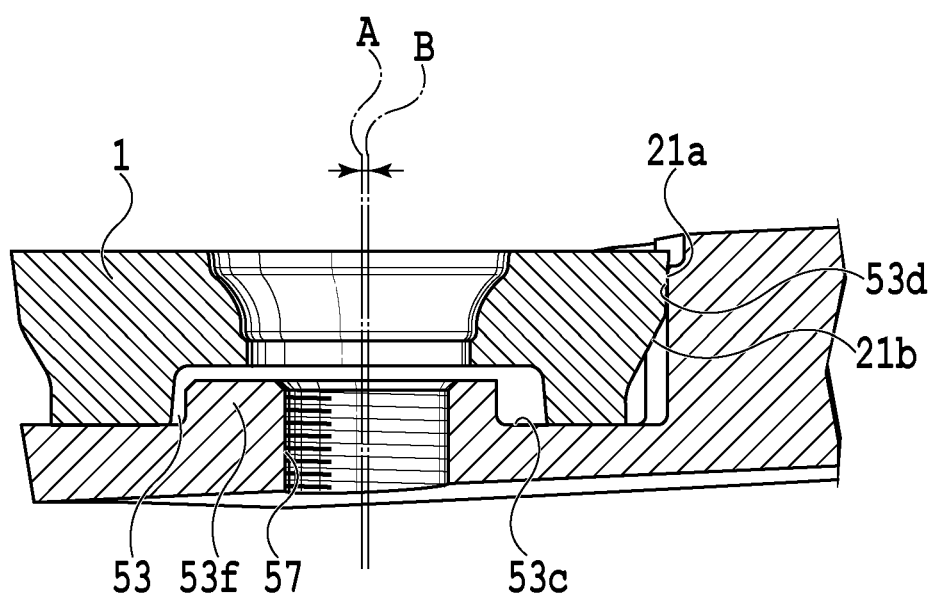
FIG. 8 is a cross-sectional view taken along line VIII-VIII in FIG. 7.

Now, one cutting insert 1 in a portion of FIG. 5 which is enclosed by a circle VII will be described based on FIG. 7 and FIG. 8. FIG. 7 is a diagram illustrating that the cutting insert 1 is simply mounted in the insert mounting seat 53 with a mounting screw 55 removed from the cutting insert 1 and with the seating surface of the cutting insert 1 in abutting contact with the abutment surface of the insert mounting seat 53. FIG. 8 is a cross-sectional view taken along line VIII-VIII in FIG. 7.

The insert mounting seat 53 includes a bottom wall surface 53c which is placed in abutting contact with the lower surface 7 of the cutting insert 1 and side wall surfaces 53d and 53e located substantially perpendicular to the bottom wall surface 53c. A projecting portion 53f is formed on the bottom wall surface 53c and includes a threaded hole 57 into which the mounting screw 55 used to mount the cutting insert 1 is screwed. As is apparent from FIG. 8, the projecting portion 53f is shaped so as to be received in the recessed portion 7b of the cutting insert 1 with a gap present between the projecting portion 53f and the recessed portion 7b. As shown in FIG. 7 and FIG. 8, when the cutting insert 1 is simply placed in the insert mounting seat 53, the mounting hole 11 in the cutting insert 1 and the threaded hole 57 in the insert mounting seat 53 are associated with each other so that the axis A of the mounting hole 11 and an axis B of the threaded hole 57 are offset. For example, the offset distance is 0.16 mm. However, in this case, the hole's axes A and B are parallel. Thus, when the mounting screw 55 is screwed into the threaded hole 57 in the insert mounting seat 53 through the mounting hole 11 in the cutting insert 1, the cutting insert 1 is pressed against the side wall surfaces 53d and 53e of the insert mounting seat 53, particularly the side wall surface 53d and thus firmly fixed. Thus, the upper surface-side side surface portion 21a of the body portion side surface 21 of the cutting insert 1 is kept in firm abutting contact with the side wall surfaces 53d and 53e. When the cutting insert 1 is thus mounted in the insert mounting seat 53, one usable cutting edge 23u of one projecting portion 15 is exposed. On the other hand, the two other projecting portions 15, particularly the projecting portion 15 positioned backward in a rotating direction K of the cutting tool 3, is received or housed in corresponding depressed portions 53g and 53h of the insert mounting seat 53 in a noncontact manner. Thus, none of the cutting edges 23 other than the usable cutting edge 23u is involved in cutting. In particular, the cutting edges of the projecting portions 15 with no usable cutting edge 23u can be more appropriately protected.

The operation and effects of the cutting insert 1 and cutting tool 3 according to the first embodiment described above will be described.

First, the projecting portions 15 are provided on the cutting insert 1, and the cutting edge 23 is provided on each of the projecting portions 15. Hence, the length between the projecting portion side surfaces 29 of one projecting portion 15, particularly the length L between the corners 23c of two cutting edges 23, can be set smaller than the diameter of the inscribed circle IC of the insert body portion 13. Thus, when the cutting insert 1 is mounted in the tool body, the radial rake angle of the cutting edge 23 can be set more easily to have a positive angle, compared to the conventional cutting insert. Consequently, compared to the cutting insert in Japanese Patent Laid-Open No. H6-262422 (1994), the cutting insert 1 allows the radial rake angle to be set to a desired value without a reduction in the size of the cutting insert. This enables a significant reduction in cutting resistance without decreasing the strength of the cutting insert. At the same time, the present configuration allows the round corner surface to be set for the cutting edge of each projecting portion. This in turn allows the size of the corner or round corner surface of the cutting edge to be freely set without the need for a reduction in the number of cutting edges of the cutting insert.

Furthermore, the insert body portion 13 has the projecting portions 15 projecting therefrom. Thus, as described above, the size of the projecting portion 15 with the cutting edge provided thereon can be significantly reduced compared to the size of the insert body portion 13. Therefore, the first embodiment can provide a larger back support portion for the tool body. That is, compared to the conventional technique, the first embodiment increases, as shown in FIG. 5, the volume of a part of the tool body portion which is located behind the cutting edge. Hence, the cutting insert and cutting tool according to the present embodiment allow the cutting insert to be more stably supported in the tool body, thus enabling possible chattering to be suppressed.

Second, in the cutting insert 1, the lower surface 7 of the cutting insert and the body portion side surface 21 of the insert body portion 13 are utilized as a seating surface. None of the surfaces of the projecting portion 15 other than the lower surface 27 is utilized as a cutting insert restricting surface or a cutting insert seating surface. Thus, the round corner surfaces of the unused projecting portions 15 can be protected, and the cutting insert 1 can be stably assembled even when the cutting insert 1 includes large round corner surfaces. In the cutting insert according to the conventional technique, areas with the round corner surfaces formed therein are, as described above, used as cutting insert restricting surfaces. Consequently, excessive contact may occur between the tool body and the round corner portions, serving as restricting surfaces, thus damaging the round corner portions. Furthermore, large round corner surfaces may hinder the cutting insert 1 from being appropriately fixed due to the reduced area of the contact between the cutting insert and the tool body. In contrast, in the cutting insert 1 and the rotary cutting tool 3, the portions with the round corner surfaces formed therein are housed in the depressed portions or pockets formed in the tool body, and the body portion side surfaces are used as restricting surfaces for the cutting insert. Thus, the round corner surfaces can be protected, and the cutting insert can be stably fixed in actuality.

Now, a cutting insert 101 and a cutting tool 103 according to a second embodiment of the present invention will be described. In the following description, components which are the same or substantially the same as already described components are denoted in the figures using the same reference numerals, and duplicate descriptions of these components are omitted. The features or configurations described in the first embodiment are similarly applied to the cutting insert 101 and cutting tool 103 according to the second embodiment, unless otherwise noted. Furthermore, the cutting insert and cutting tool according to the second embodiment can be varied similarly to the cutting insert and cutting tool according to the first embodiment. They can achieve similar operation and effects.

Like the above-described cutting insert 1, the cutting insert 101 includes the upper surface 5, the lower surface 7, and the peripheral side surface 9, and further includes the insert body portion 13 and three projecting portions 15. The cutting insert 101 is formed to be rotationally symmetrically around the axis A.

Figure 9:
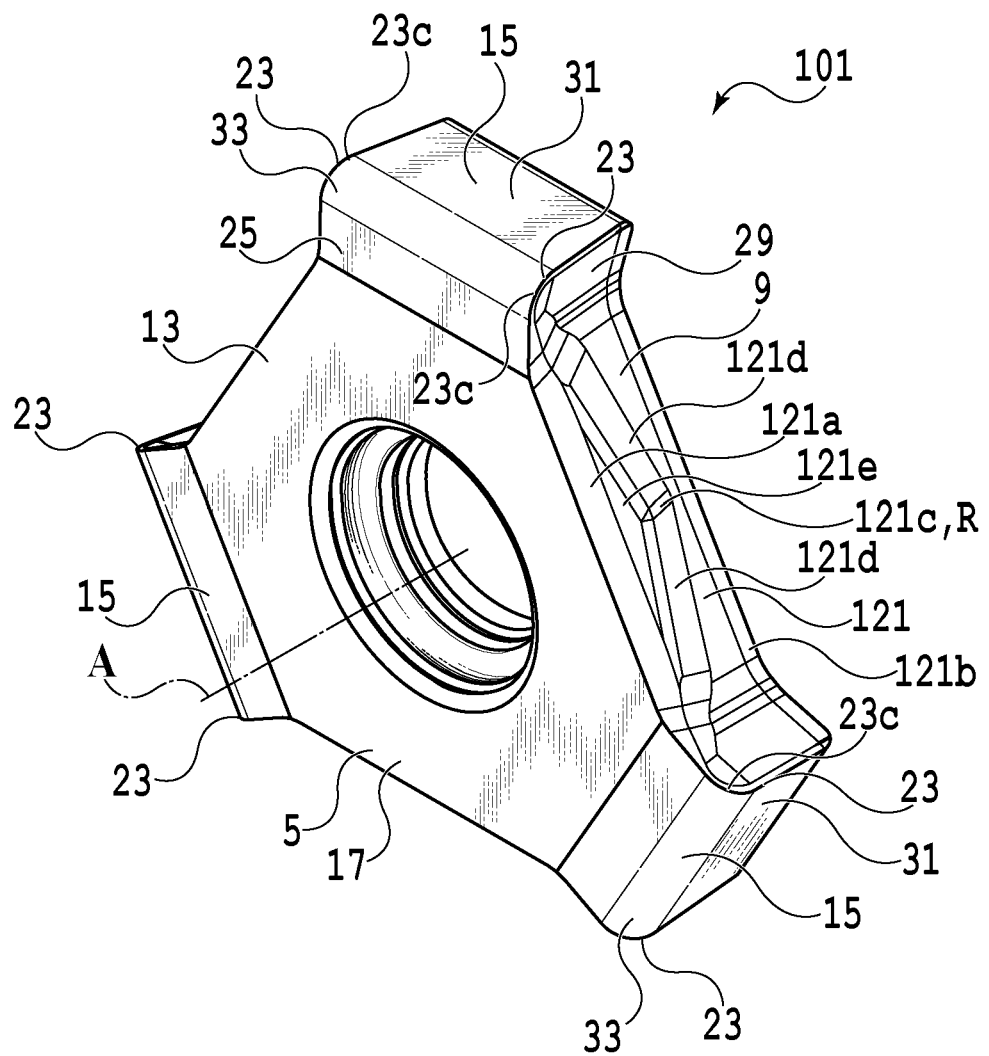
FIG. 9 is a perspective view of a cutting insert according to a second embodiment of the present invention.
Figure 10:
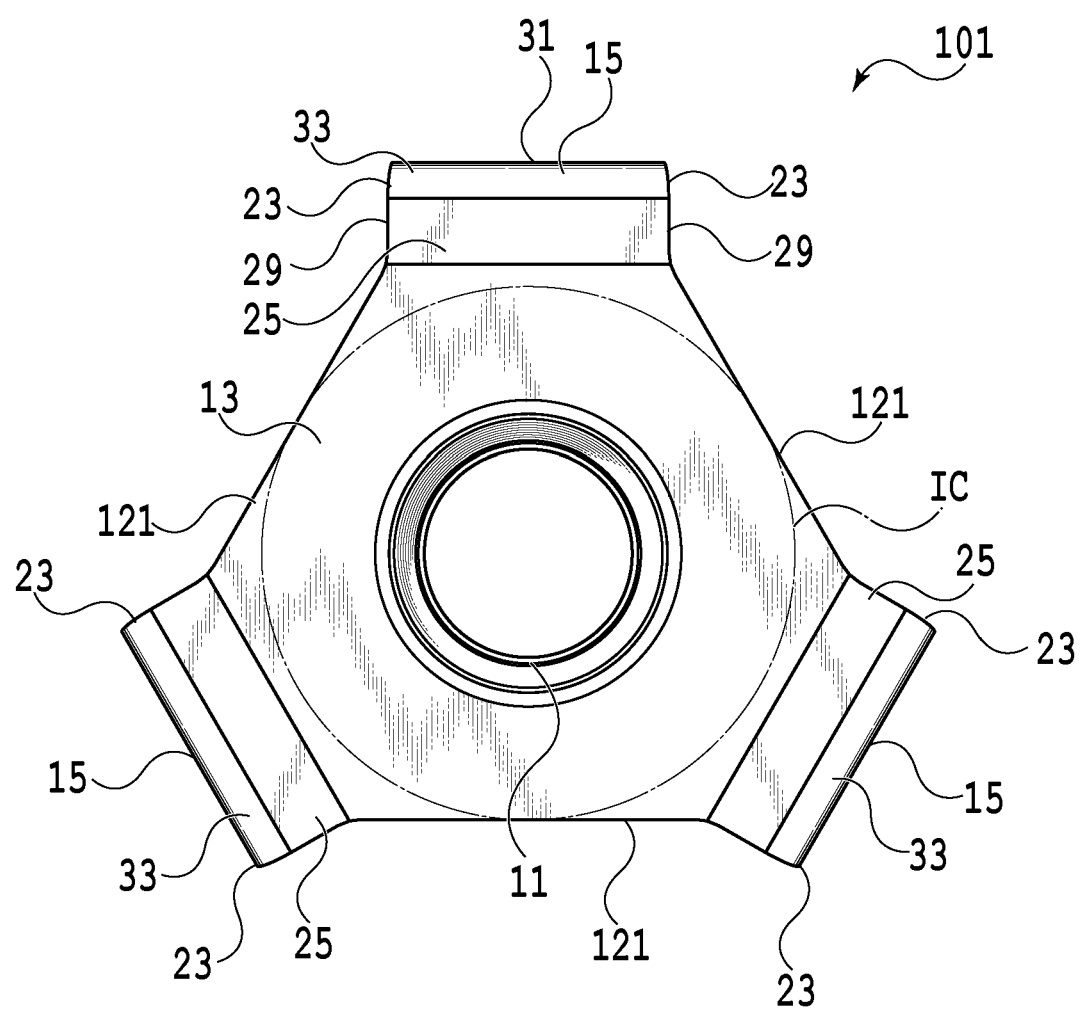
FIG. 10 is a top view of the cutting insert in FIG. 9.
Figure 11:
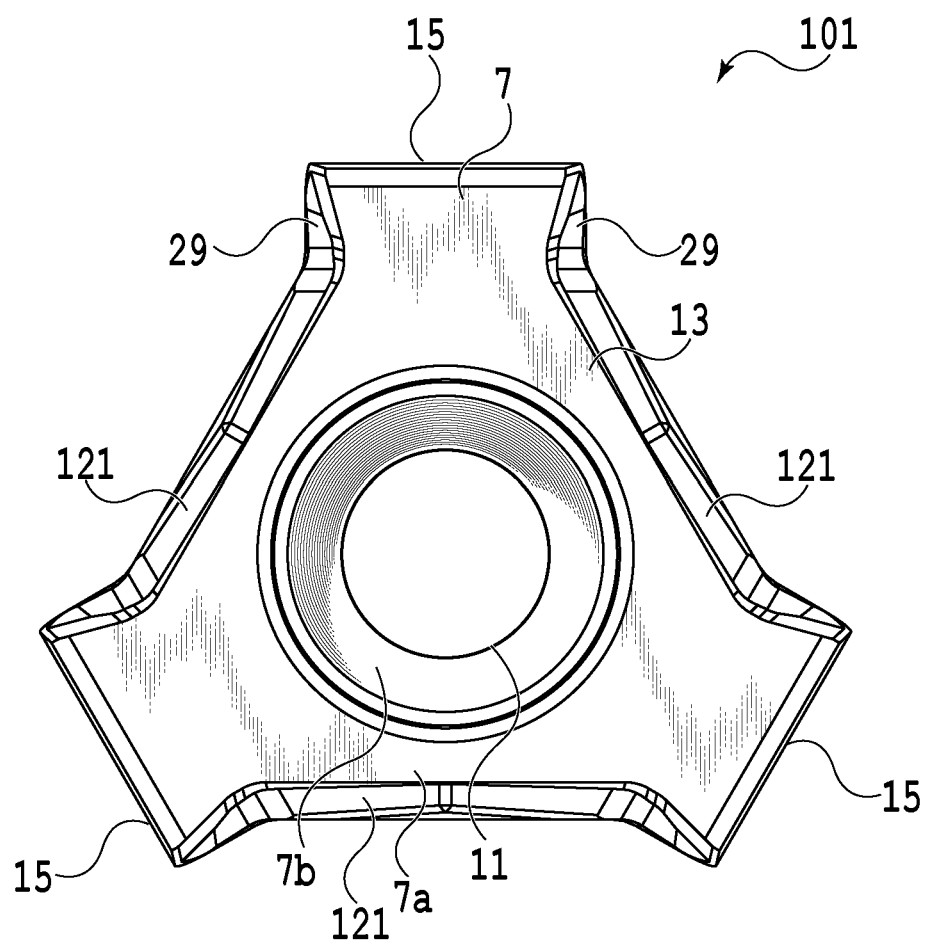
FIG. 11 is a bottom view of the cutting insert in FIG. 9.

The cutting insert 101 includes a body portion side surface 121 of the insert body portion 13 which is different from the body portion side surface of the cutting insert 1. The body portion side surface 121 of the cutting insert 101 includes an upper surface-side side surface portion 121a, a lower surface-side side surface portion 121b, and an intermediate side surface portion 121c positioned therebetween (see FIG. 9). The intermediate side surface portion 121c, that is, the raised portion R, projects in the form of a substantial triangular pyramid (see FIG. 9). Thus, the intermediate side surface portion 121c includes rectangular face portions 121d extending from the corresponding projecting portions 15 so as to jut obliquely outward and a triangular face portion 121e extending between the upper surface-side side surface portion 121a and the two rectangular surface portions 121d. However, as described in the first embodiment, the intermediate side surface portion 121c, that is, the raised portion R, is not intended to function as a seating surface. Thus, the raised portion R is formed to appear hidden behind the body portion upper surface 17 when the cutting insert 101 is seen from a side opposite to the body portion upper surface (see FIG. 10).

Figure 12:
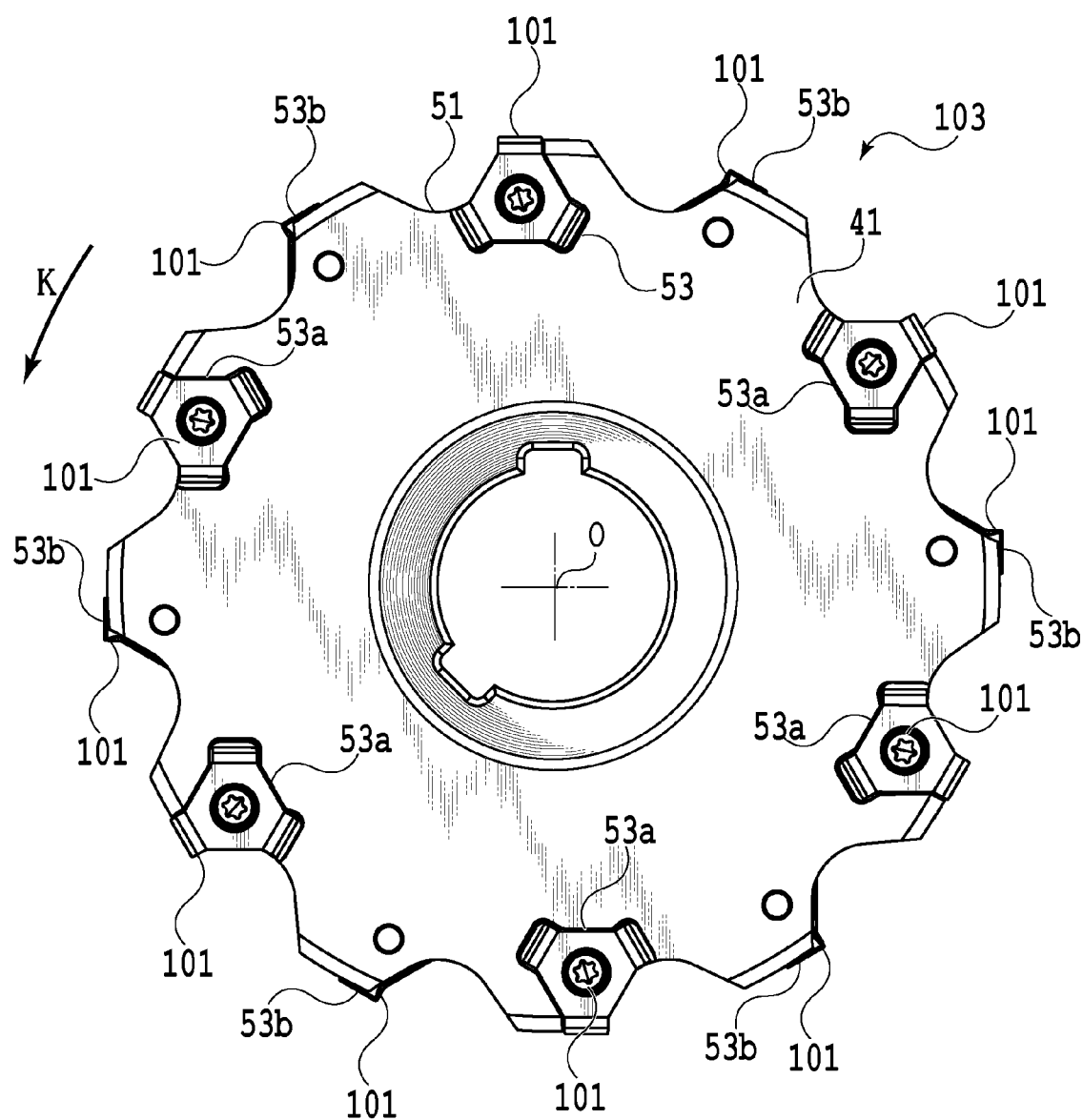
FIG. 12 is an end view of a cutting tool in which the cutting insert in FIG. 9 is mounted according to the second embodiment of the present invention.
Figure 13:
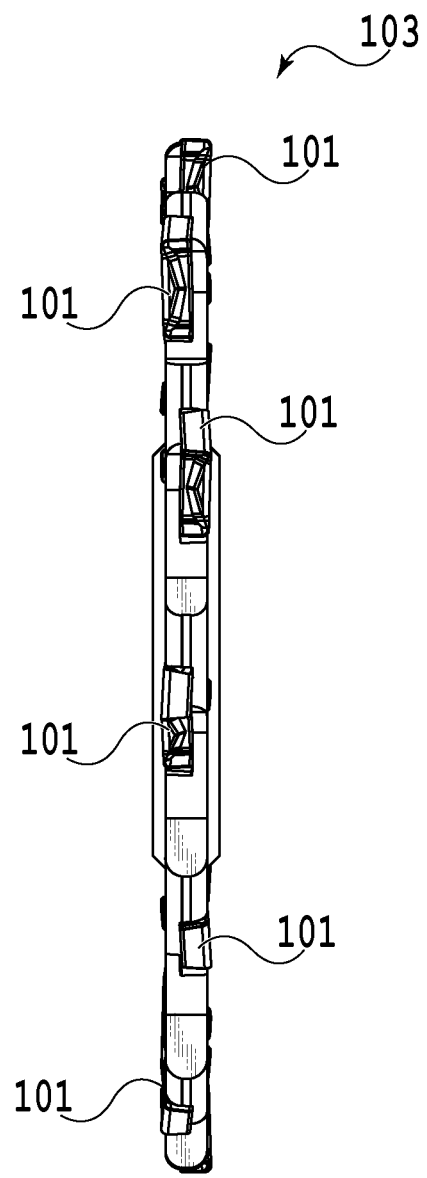
FIG. 13 is a front view of the cutting tool in FIG. 12.

As shown in FIG. 12 and FIG. 13, the cutting insert 101 configured as described above is detachably mounted in the tool body 41 of the rotary cutting tool 103. The tool body 41 is similar to the tool body 41 according to the first embodiment and includes the first insert mounting seat and the second insert mounting seat. The cutting insert is mounted in the tool body 41 in a manner similar to that described in the first embodiment (see FIG. 5 to FIG. 8, FIG. 12, and FIG. 13).

Like the cutting insert 1 and cutting tool 3 according to the first embodiment, the cutting insert 101 and cutting tool 103 according to the second embodiment has the above-described features and can exert the above-described effects.

Figure 14:
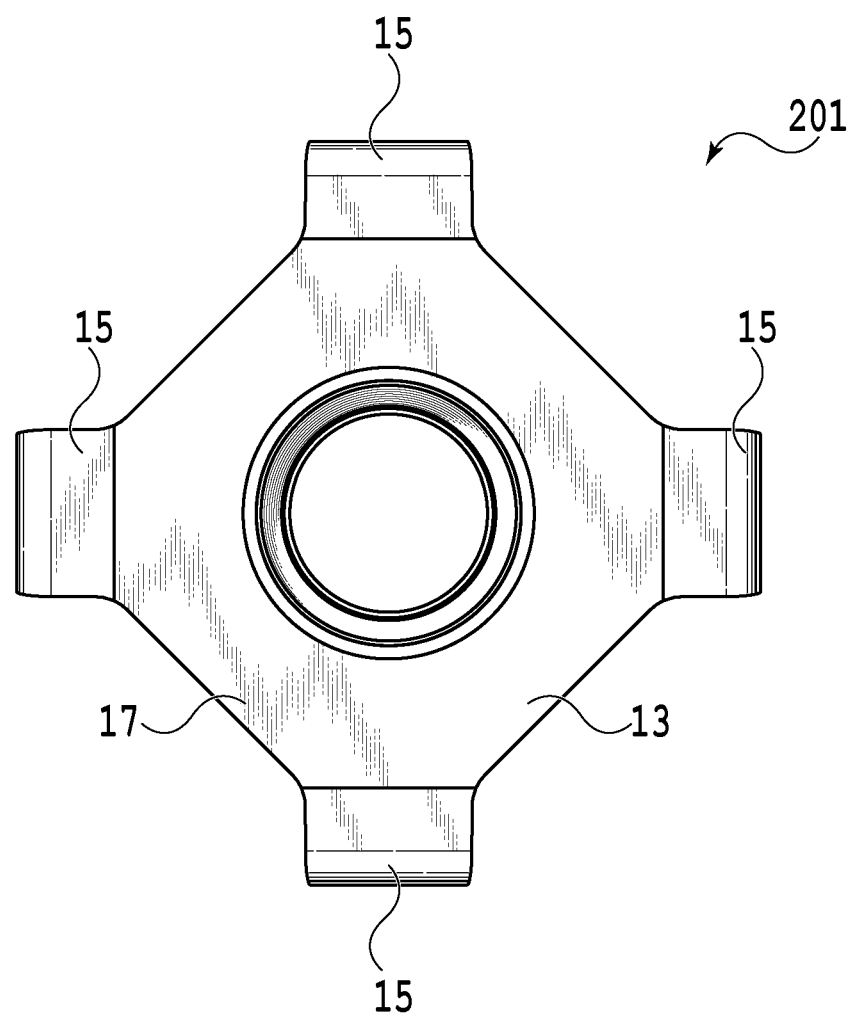
FIG. 14 is a diagram illustrating a variation of the cutting insert according to the preset invention.
Figure 15:
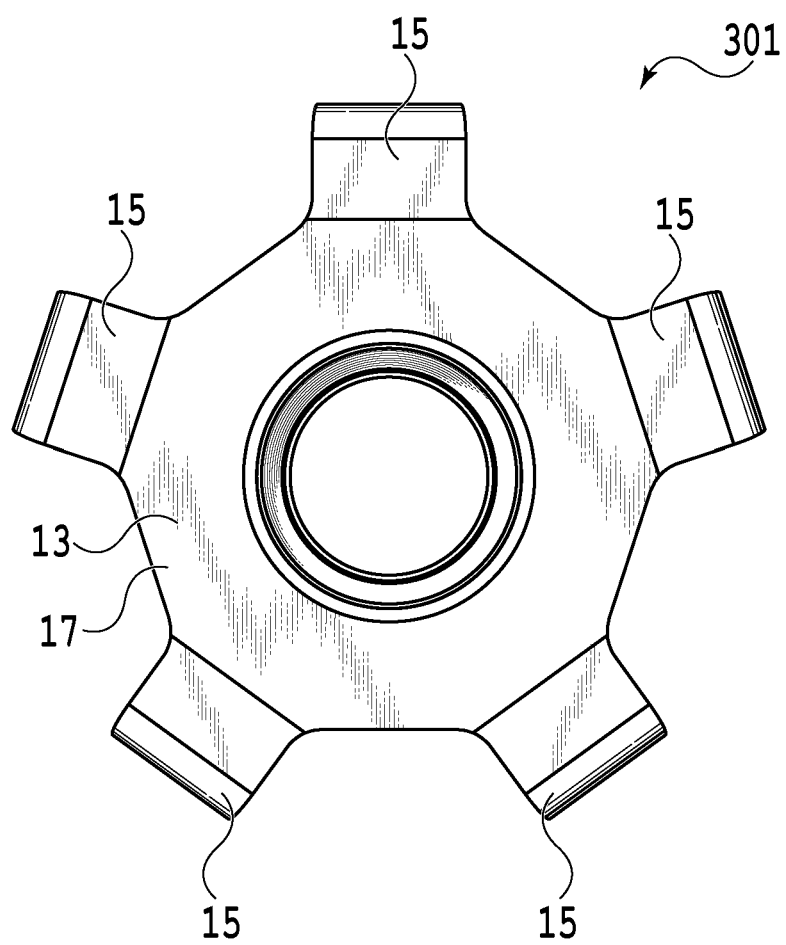
FIG. 15 is a diagram illustrating another variation of the cutting insert according to the preset invention.

The present invention has been described based on the two embodiments. However, the cutting insert according to the present invention is not limited to the cutting insert appearing substantially like a triangle in a plan view as is the case with the two embodiments. The present invention allows for cutting inserts 201 and 301 in which for example, as shown in FIG. 14 and FIG. 15, the body portion upper surface 17 of the insert body portion 13 appears shaped like a regular tetragon or a regular pentagon with the projecting portions 15 provided at the vertices of the regular tetragon or regular pentagon. Thus, the cutting insert may be configured such that the upper surface of the insert body portion 13 appears shaped like one of various regular polygons. Moreover, the upper surface of the insert body portion may be shaped like an inequilateral polygon formed of sides with different lengths instead of the regular polygon. Even a cutting insert shaped like such a polygon as described above can have a characteristic configuration for the projecting portions as described above.

Figure 16:
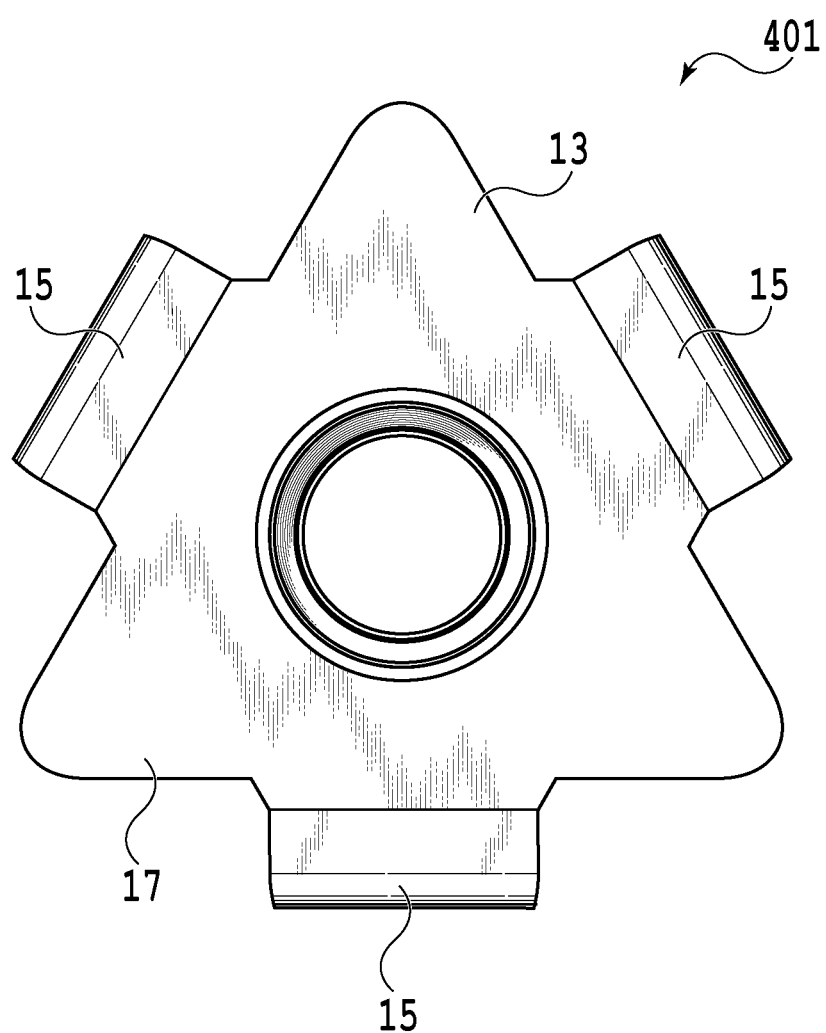
FIG. 16 is a diagram illustrating yet another variation of the cutting insert according to the preset invention.
Figure 17:
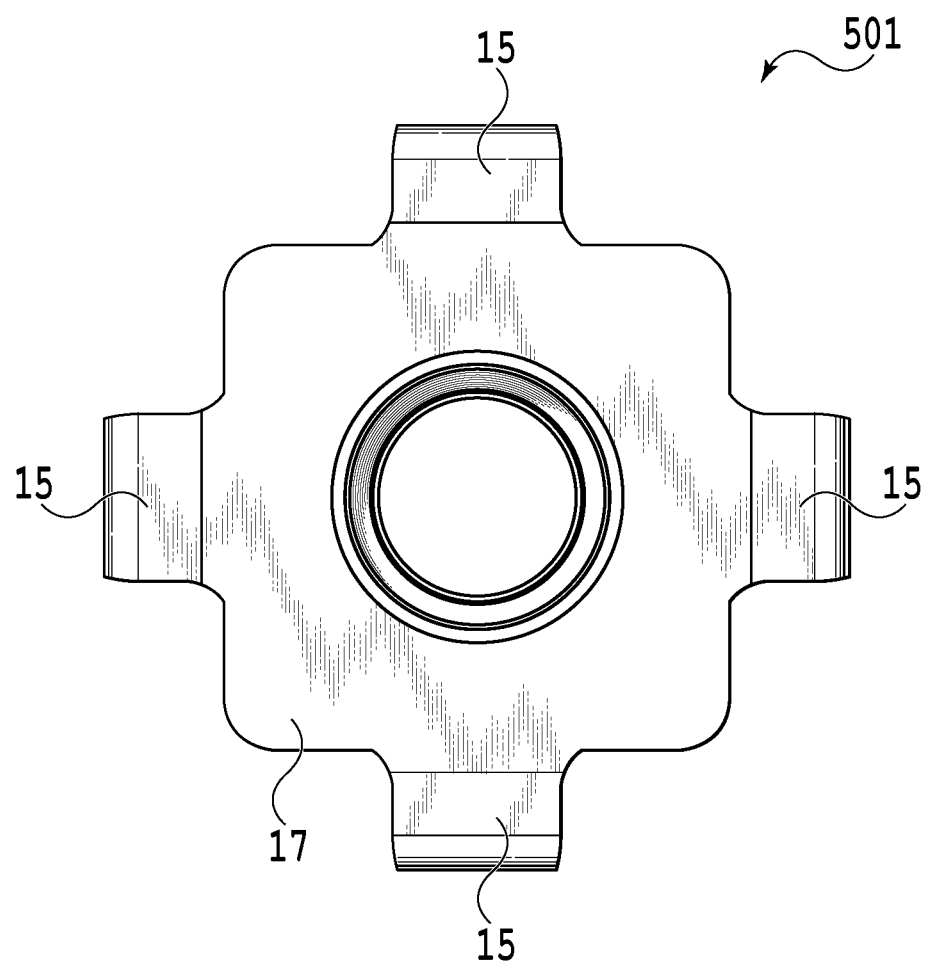
FIG. 17 is a diagram illustrating still another variation of the cutting insert according to the preset invention.
Figure 18:
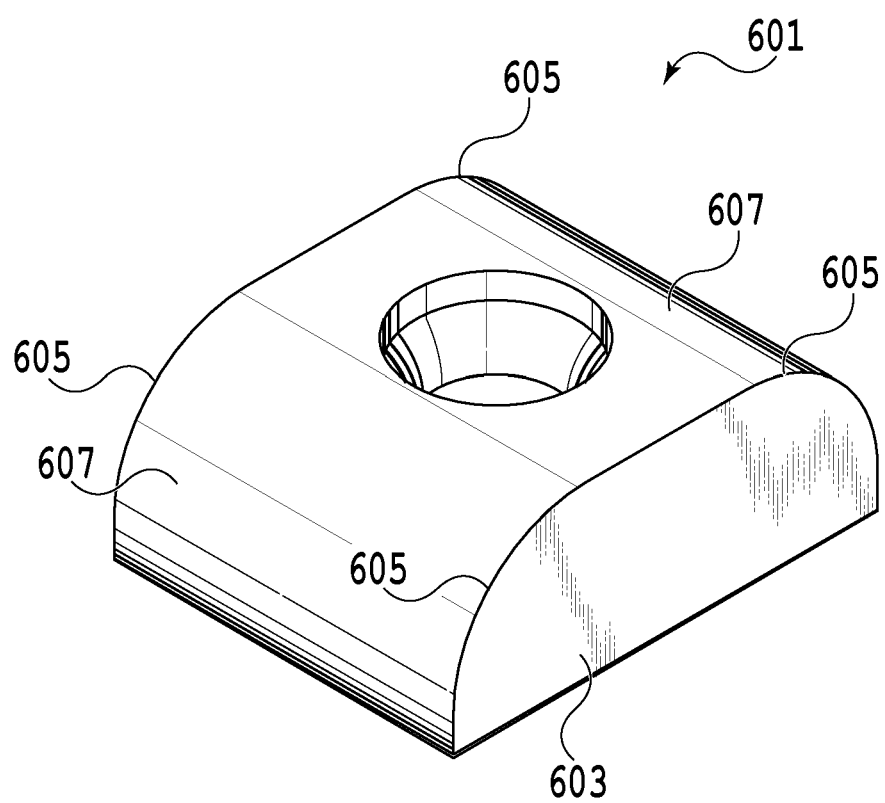
FIG. 18 is a perspective view of a conventional cutting insert.
Figure 19:
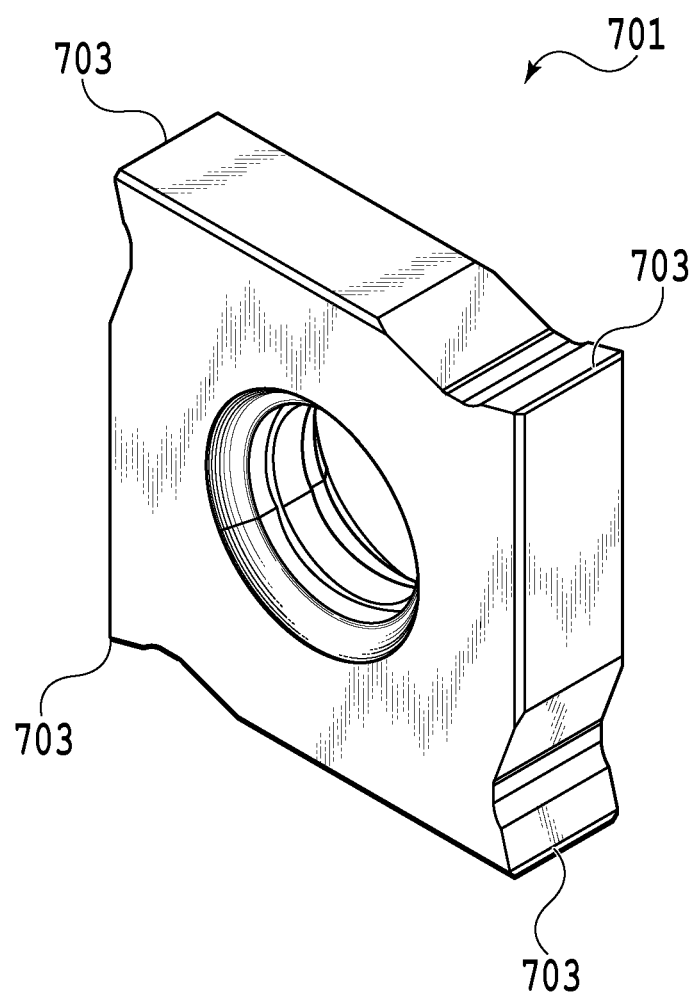
FIG. 19 is a perspective view of another conventional cutting insert.

Furthermore, the present invention allows for cutting inserts 401 and 501 in which, as shown in FIG. 16 and FIG. 17, the body portion upper surface 17 of the insert body portion 13 appears shaped like a polygon such as a triangle or a rectangle with the projecting portions 15 provided to line on the respective sides of the polygon. Even in this case, the features described based on the above-mentioned embodiments such as the length of the round corner surface of the projecting portion are applicable.

The body portion upper surface 17 of the insert body portion 13 may be shaped like a circle or an ellipse.

Furthermore, in the above-mentioned embodiments, the plurality of projecting portions of one cutting insert have the same configuration or similar configurations. However, the plurality of projecting portions of one cutting insert may be different from one another.

Additionally, according to the above-described embodiments, the round corner surface extends between the projecting portion side surfaces so as to be continuous with the projecting portion side surfaces. However, the round corner surface may not be continuous between the projecting portion side surfaces. In the above-described embodiments, one round corner surface 33 is continuous between the side surfaces 29 so as to form the corner 23c on the cutting edge 23 at the edge of the each of the two projecting portion side surfaces 29. However, the round corner surface or curved corner surface of one projecting portion 15 may be formed of at least two round corner surface portions or curved corner surface portions separated from each other by one or more discontinuous portions (for example, nicks). For example, if the cutting insert includes one discontinuous portion extending from the projecting portion upper surface to the projecting portion side end surface, the round corner surface of one projecting portion 15 may include a total of two corner surface portions, a corner surface portion which is continuous with one of the projecting portion side surfaces 29 and which includes one of the corners 23c at an edge thereof and a corner surface portion which is continuous with the other projecting portion side surface 29 and which includes one of the corners 23c at an edge thereof.

In addition, in the above-mentioned embodiments, the first and second insert mounting seats are formed so as to be open in the respective opposite end surfaces of the tool body. However, a plurality of insert mounting seats with the same configuration may be formed in only one of the end surfaces. That is, the present invention includes cutting tools in what is called a half side form.

The present invention has been described somewhat specifically with reference to the above-described embodiments and variations thereof. However, the present invention is not limited to the above-described embodiments. It should be appreciated that various alterations and changes may be made to the present invention without departing from the spirit and scope of the invention set forth in the claims. That is, the present invention includes any variations, applications, and equivalents embraced in the concepts of the present invention defined by the claims.

What is claimed is:

1. A cutting insert comprising:
   an insert body portion comprising a body portion upper surface, a body portion lower surface located opposite the body portion upper surface, and body portion side surfaces extending between the body portion upper surface and the body portion lower surface, the insert body portion including an axis defined therein which passes through the body portion upper surface and the body portion lower surface; and
   a plurality of projecting portions each comprising a cutting edge, each projecting portion provided integrally with the insert body portion at an outer position of the insert body portion in a direction orthogonal to the axis,
   wherein the projecting portion comprises a projecting portion upper surface connected to the body portion upper surface, a projecting portion lower surface connected to the body portion lower surface, two projecting portion side surfaces each connected to the corresponding body portion side surface, and a projecting portion side end surface extending therebetween, and the projecting portion comprises a round corner surface formed thereon and extending between the projecting portion upper surface and the projecting portion side end surface,
   wherein the cutting edge is formed along an intersecting ridge portion between the projecting portion side surface and each of the projecting portion upper surface, the round corner surface, and the projecting portion side end surface, so as to include a corner formed along an edge of the round corner surface and such that the projecting portion side surface serves as a rake face,
   wherein the projecting portion is designed in such a manner that a length between the two projecting portion side surfaces is shorter than a diameter of an inscribed circle defined on the body portion upper surface; and
   wherein all projecting portions on the cutting insert are identical to one another.

2. The cutting insert according to claim 1, wherein the length between the two projecting portion side surfaces is larger than a thickness of the insert body portion.

3. The cutting insert according to claim 1, wherein the insert body portion comprises a raised portion formed on the body portion side surface.

4. The cutting insert according to claim 3, wherein the raised portion is formed to appear hidden when the cutting insert is seen from a side opposite to the body portion upper surface.

5. The cutting insert according to claim 1, wherein the projecting portions are formed such that when the body portion upper surface of the insert body portion appears shaped like a polygon, the projecting portions are positioned at vertices of the polygon.

6. The cutting insert according to claim 1, wherein the projecting portions are formed such that when the body portion upper surface of the insert body portion appears shaped like a polygon, the projecting portions are positioned on sides of the polygon.

7. The cutting insert according to claim 5, wherein the body portion upper surface of the insert body portion is shaped substantially like a triangle.

8. The cutting insert according to claim 6, wherein the body portion upper surface of the insert body portion is shaped substantially like a triangle.

9. The cutting insert according to claim 1, wherein:
each projecting portion is formed substantially plane-symmetrically with respect to a first plane (S) that extends so as to contain the axis of the insert body portion.

10. The cutting insert according to claim 1, wherein:
the projecting portion side surfaces are inclined such that a length (L2) between the projecting portion side surfaces belonging to a single projecting portion decreases with increasing distance from the cutting edge.

11. The cutting insert according to claim 1, wherein:
each projecting portion is formed substantially plane-symmetrically with respect to a first plane (S) that extends so as to contain the axis of the insert body portion; and
the projecting portion side surfaces are inclined such that a length (L2) between the projecting portion side surfaces belonging to a single projecting portion decreases with increasing distance from the cutting edge.

12. The cutting insert according to claim 1, wherein:
none of the projecting portion side surfaces are visible in a top view of the insert body portion upper surface, and all of the projecting portion side surfaces are visible in a bottom view of the insert body portion lower surface.

13. A rotary cutting tool including a tool body with two end surfaces positioned opposite each other and each shaped substantially like a circle, an outer peripheral surface extending between the end surfaces, and a bore hole penetrating both end surfaces,
wherein the cutting tool comprises an insert mounting seat provided in the tool body and configured in such a manner that the cutting insert according to claim 1 is mounted in the insert mounting seat.

14. The rotary cutting tool according to claim 13, comprising a first insert mounting seat which is open in one of the two end surfaces and a second insert mounting seat which is open in the other of the two end surfaces.

15. A cutting insert comprising:
an insert body portion comprising a body portion upper surface, a body portion lower surface located opposite the body portion upper surface, and body portion side surfaces extending between the body portion upper surface and the body portion lower surface, the insert body portion including an axis defined therein which passes through the body portion upper surface and the body portion lower surface; and
a plurality of projecting portions each comprising a cutting edge, each projecting portion provided integrally with the insert body portion at an outer position of the insert body portion in a direction orthogonal to the axis,
wherein the projecting portion comprises a projecting portion upper surface connected to the body portion upper surface, a projecting portion lower surface connected to the body portion lower surface, two projecting portion side surfaces each connected to the corresponding body portion side surface, and a projecting portion side end surface extending therebetween, and the projecting portion comprises a round corner surface formed thereon and extending between the projecting portion upper surface and the projecting portion side end surface,
wherein the cutting edge is formed along an intersecting ridge portion between the projecting portion side surface and each of the projecting portion upper surface, the round corner surface, and the projecting portion side end surface, so as to include a corner formed along an edge of the round corner surface and such that the projecting portion side surface serves as a rake face,
wherein each projecting portion is formed substantially plane-symmetrically with respect to a first plane (S) that extends so as to contain the axis of the insert body portion; and
wherein the projecting portion side surfaces are inclined such that a length (L2) between the projecting portion side surfaces belonging to a single projecting portion decreases with increasing distance from the cutting edge.

16. The cutting insert according to claim 15 wherein:
none of the projecting portion side surfaces are visible in a top view of the insert body portion upper surface, and all of the projecting portion side surfaces are visible in a bottom view of the insert body portion lower surface.

* * * * *